(12) United States Patent
Wilkinson et al.

(10) Patent No.: US 10,821,965 B2
(45) Date of Patent: Nov. 3, 2020

(54) METHOD AND SYSTEMS FOR A GENERATOR IN A PLUG-IN HYBRID ELECTRIC VEHICLE

(71) Applicant: Ford Global Technologies, LLC, Dearborn, MI (US)

(72) Inventors: Toby-Jon Wilkinson, London (GB); James Foster, Worthing (GB); Peter Brittle, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 16/146,986

(22) Filed: Sep. 28, 2018

(65) Prior Publication Data

US 2019/0106098 A1 Apr. 11, 2019

(30) Foreign Application Priority Data

Oct. 9, 2017 (GB) .................................. 1716495.5

(51) Int. Cl.
*B60W 20/20* (2016.01)
*B60W 10/06* (2006.01)
(Continued)

(52) U.S. Cl.
CPC .............. *B60W 20/20* (2013.01); *B60K 6/46* (2013.01); *B60W 10/06* (2013.01); *B60W 10/08* (2013.01); *B60W 20/15* (2016.01); *B60W 30/20* (2013.01); *B60W 50/0097* (2013.01); *F16F 15/002* (2013.01); *B60W 2030/206* (2013.01); *B60W 2050/0012* (2013.01); *B60W 2050/0039* (2013.01); *B60W 2510/0604* (2013.01);
(Continued)

(58) Field of Classification Search
CPC ...... B60W 20/20; B60W 20/15; B60W 10/06; B60W 10/08; B60W 30/20; B60W 50/0097; B60W 2030/206; B60W 2050/0012; B60W 2050/0039; B60W 2510/0604; B60W 2710/0666; B60W 2710/086; B60W 2900/00; B60K 6/46; F16F 15/002; F16F 15/133; B60L 10/00; B60L 50/00
See application file for complete search history.

(56) References Cited

U.S. PATENT DOCUMENTS

| | | | | |
|---|---|---|---|---|
| 5,992,593 | A * | 11/1999 | Yamamoto | F16D 13/70 192/48.1 |
| 7,292,917 | B2 * | 11/2007 | Kuang | B60K 6/445 701/22 |
| 8,010,263 | B2 * | 8/2011 | Morris | B60W 10/08 701/51 |
| 2004/0212273 | A1 * | 10/2004 | Gould | F16F 15/18 310/254.1 |

(Continued)

FOREIGN PATENT DOCUMENTS

WO   2018039078 A1   3/2018

OTHER PUBLICATIONS

Great Britain Intellectual Property Office, Search Report Issued in Application No. GB1716495.5, dated Mar. 28, 2018, 4 pages.

*Primary Examiner* — Yonel Beaulieu
(74) *Attorney, Agent, or Firm* — David Kelly; McCoy Russell LLP

(57) ABSTRACT

Methods and systems are provided for operating a high voltage generator coupled to a plug-in hybrid vehicle driven by a reciprocating piston engine. In one example, a method may include, predicting variations in output torque from the reciprocating piston engine and adjusting the driving torque required for the high voltage electric generator based upon the predicted torque variations.

18 Claims, 6 Drawing Sheets

(51) Int. Cl.
*B60W 10/08* (2006.01)
*B60L 9/00* (2019.01)
*B60L 50/00* (2019.01)
*B60W 20/15* (2016.01)
*F16F 15/00* (2006.01)
*B60K 6/46* (2007.10)
*B60W 50/00* (2006.01)
*B60W 30/20* (2006.01)
*F16F 15/133* (2006.01)

(52) U.S. Cl.
CPC ............... *B60W 2710/0666* (2013.01); *B60W 2710/086* (2013.01); *B60W 2900/00* (2013.01); *F16F 15/133* (2013.01)

(56) References Cited

U.S. PATENT DOCUMENTS

| | | | | |
|---|---|---|---|---|
| 2009/0069098 | A1* | 3/2009 | Uehara | F16F 15/13484 464/68.8 |
| 2009/0071735 | A1* | 3/2009 | Kaneko | B60K 6/26 180/65.285 |
| 2012/0032637 | A1* | 2/2012 | Kotooka | B60W 20/00 320/109 |
| 2012/0271492 | A1* | 10/2012 | Wang | B60W 10/06 701/22 |
| 2014/0188319 | A1* | 7/2014 | Ohno | B60W 10/08 701/22 |
| 2015/0232086 | A1* | 8/2015 | McGee | B60W 10/06 477/5 |
| 2015/0307082 | A1* | 10/2015 | Nallapa | B60W 10/06 701/22 |

* cited by examiner

METHOD AND SYSTEMS FOR A GENERATOR IN A PLUG-IN HYBRID ELECTRIC VEHICLE

CROSS REFERENCE TO RELATED APPLICATION

The present application claims priority to Great Britain patent application No. 1716495.5, entitled "A RANGE EXTENDED PLUG-IN HYBRID ELECTRIC VEHICLE", and filed on Oct. 9, 2017. The entire contents of the above-listed application are hereby incorporated by reference for all purposes.

FIELD

This disclosure generally relates to motor vehicles and in particular to a range extended plug-in hybrid electric vehicle having a reciprocating piston engine driving a high voltage electric generator.

BACKGROUND/SUMMARY

Range extended Plug-in Hybrid Electric Vehicles (PHEVs) normally have a high voltage electric generator that is coupled to a conventional reciprocating piston internal combustion engine. The PHEV is configured to have an on-board high voltage battery charged by connecting it to a main electrical power grid when the PHEV is parked. The electrical energy stored in the high voltage battery is then used to power a high voltage electric traction motor to drive one or more wheels of the PHEV.

When the state of charge of the high voltage battery drops below a predefined level, an electric machine is used to crank the engine or a separate starter motor is used to crank the engine to start it and when it is running, torque from the engine is used by the high voltage generator to generate electrical energy that enables the PHEV to continue travelling even though the high voltage battery is almost exhausted.

However, a reciprocating piston engine generates torsional vibrations that are potentially damaging to the high voltage generator and so conventional practice is to add a large additional mass to a standard flywheel of the engine or use a dual mass flywheel in order to reduce the magnitude of these vibrations to an acceptable level. The additional mass added ensures that the engine revolves more smoothly when running by utilizing the inertia of the rotating mass of the heavier flywheel or flywheels.

However, the inventors herein have recognized potential issues with such systems. Adding a heavier flywheel or flywheels may require 10 kg to be added to a standard flywheel of a 1 liter engine in order to achieve the desired effect and this has a number of disadvantages. Firstly, the additional weight reduces the range when the PHEV is operating in electric mode because the additional mass has to be transported. The additional mass will also reduce the performance of the PHEV due to the need to accelerate a heavier vehicle and has a negative effect on the fuel economy of the engine due to the additional energy required to accelerate the heavier flywheel when the engine is running.

It is an object of this disclosure to provide a range extended plug-in hybrid electric vehicle that overcomes or minimize the aforesaid disadvantages. In one example, the issues described above may be at least partly addressed by a method comprising: a system for a range extended plug-in hybrid electric vehicle comprises: a reciprocating piston engine, a drivetrain including a transmission driving at least one road wheel, a low voltage electrical system including a low voltage electrical storage device and an electronic controller, a high voltage electrical system including a high voltage electrical generator driven via a coupling by the reciprocating piston engine, a high voltage electrical storage device to store electrical energy input from an external mains supply, a high voltage electric traction motor electrically connected to the high voltage storage device and arranged to selectively drive the transmission, and a controller with computer readable instructions stored on non-transitory memory to: during operation of the reciprocating piston combustion engine use a model to produce an output of predicted torque variations from the reciprocating piston engine based upon one or more inputs indicative of the operation of the reciprocating piston engine and use the output of torque variations from the model to control the operation of the high voltage electrical generator.

In one example, the high voltage electrical generator may be controlled to vary the torque required to drive it so as to compensate for the expected variations in engine output torque. Controlling the operation of the high voltage generator may comprise varying the magnitude of current through stationary exciter field coils of the high voltage electrical generator.

The electronic controller may be arranged to provide the output model of expected torque variations from the model to a dynamic system model of the drive path from the engine to the high voltage electrical generator and use an output from dynamic system model to control the operation of the high voltage electrical generator. The high voltage electrical generator may be controlled such that the torque required for driving the high voltage electrical generator is phase shifted with respect to the expected torque variations of the reciprocating piston engine so as to lead the expected torque variations of the reciprocating piston engine.

The output of expected torque variations produced by the model may be based partly upon an input indicative of the rotational speed of a crankshaft of the reciprocating piston engine. The output of expected torque variations produced by the model may be also be based partly upon an input indicative of the rotational position of a crankshaft of the reciprocating piston engine. Further, the output of expected torque variations produced by the model may be based partly upon an input indicative of a torque demand to be met by the reciprocating piston engine, the number of cylinders of the reciprocating piston engine, and the combustion timing of the reciprocating piston engine.

The coupling may comprise a flywheel of predefined inertia fastened to one end of a crankshaft of the reciprocating piston engine, a drive plate of lower inertia than the flywheel driveably connected to an input shaft of the high voltage electrical generator and a resilient rotary drive driveably connecting the flywheel to the drive plate.

In this way, by dynamically adjusting the electrical input required to drive the electrical generator based on expected torque variations from the reciprocating piston engine, the adverse effect of torsional vibrations of the piston on the electrical generator may be averted. The technical effect of using a model to predict the engine torque variation and the corresponding electrical input required to drive the electrical generator is that addition weight may no longer be desired to dampen the vibrations, thereby reducing the overall weight of the vehicle and improving fuel efficiency and range in the PHEV.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
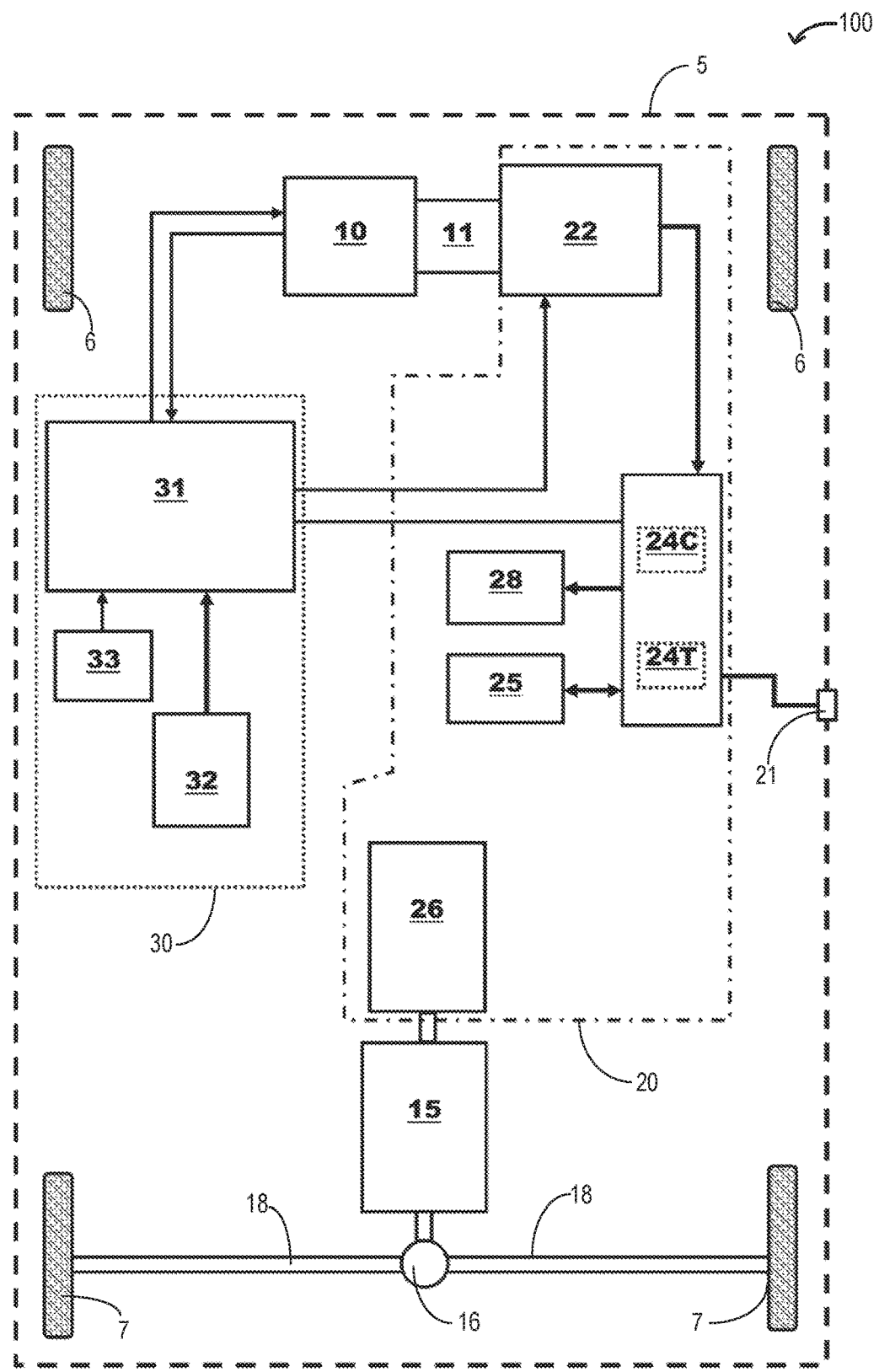
FIG. 1 shows a schematic diagram of a range extended plug-in hybrid electric vehicle (PHEV) in accordance with the disclosure.
Figure 2:
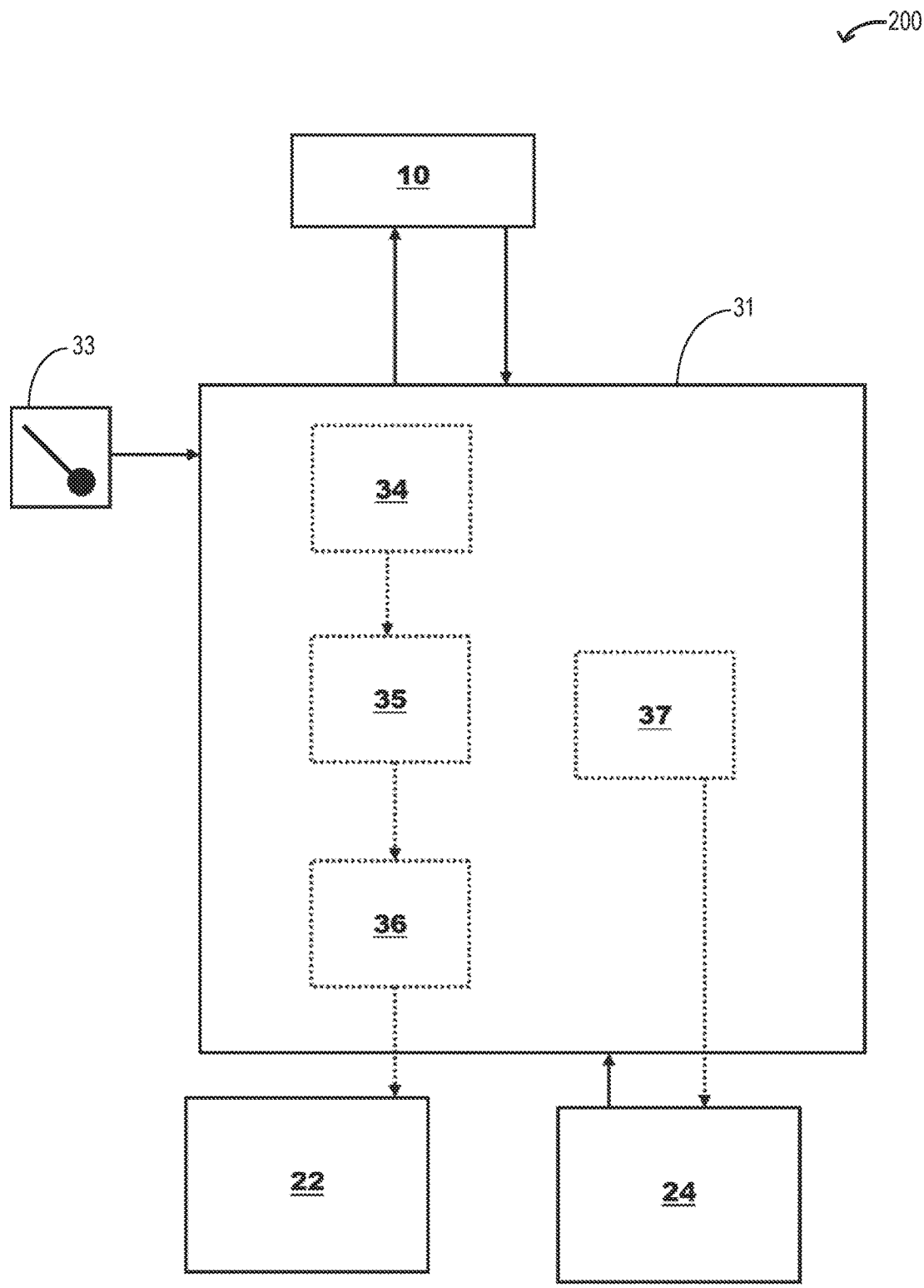
FIG. 2 shows a schematic diagram of an electronic controller forming part of the PHEV shown in FIG. 1.
Figure 3:
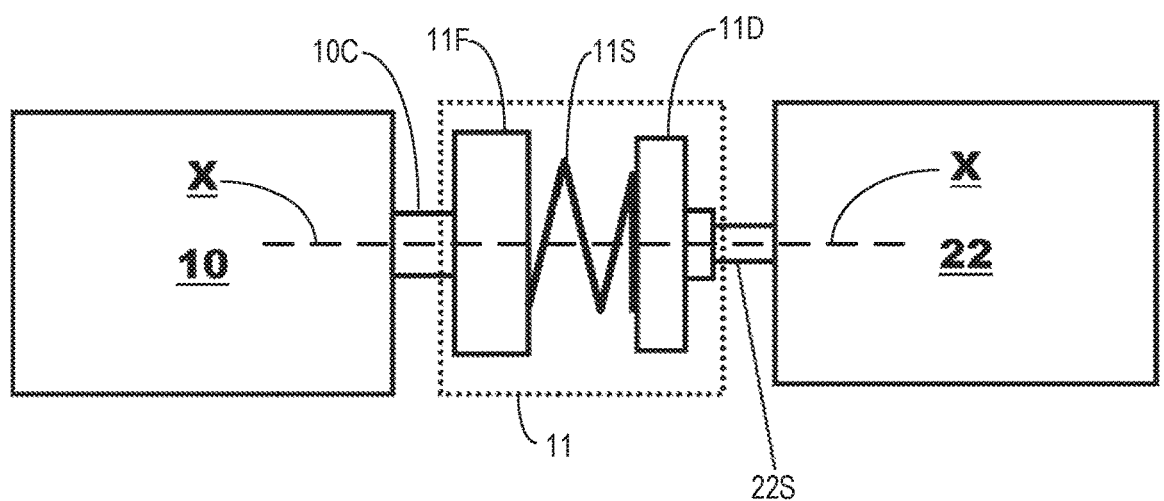
FIG. 3 is a schematic diagram showing a connection of a reciprocating piston engine of the PHEV to a high voltage electrical generator of the PHEV via a coupling.
Figure 4:
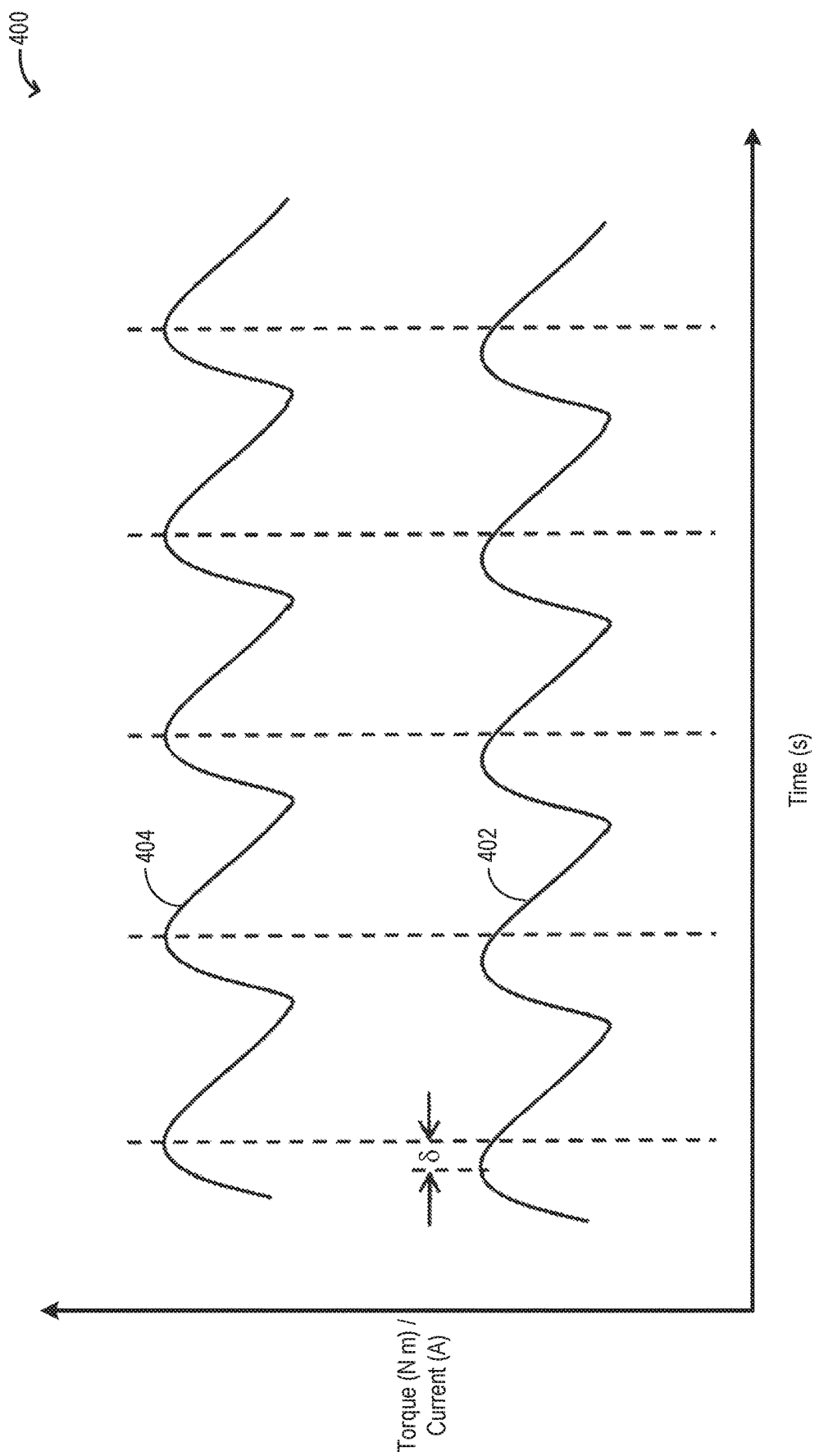
FIG. 4 is a diagrammatic representation of the relationship between engine output torque and generator electrical input (driving torque) over time.

The following description relates to systems and methods for adjusting operations of an electric generator operation driven by a reciprocating piston engine coupled to a plug-in hybrid electric vehicle (PHEV). An example schematic of a PHEV including an engine and a high voltage electrical generator is shown in FIG. 1 while the connection between the engine and the electrical generation is depicted in FIG. 2. An engine controller, such as shown in FIG. 3, may be configured to perform a control routine, such as the example routine of FIG. 5, to adjust operation of the electric generator based on expected torque variations from the engine. A plot of a relationship between engine output torque (T) and generator driving torque (G) over time is shown in FIG. 4. An example operation of the PHEV is shown in FIG. 6.

With reference to FIGS. 1 to 3 there is shown a range extended plug-in hybrid electric vehicle 5 having a reciprocating piston engine 10 such as a gasoline or diesel internal combustion engine driving a high voltage electrical generator 22 via a coupling 11, a drivetrain including a transmission 15 driving a pair of rear road wheels 7 via a driveline comprised of a differential 16 and rear drive shafts 18, a pair of front wheels 6, a high voltage electrical system 20 and a low voltage electrical system 30. It will be appreciated that in other embodiments the transmission 15 may be arranged to drive only the front road wheels 6 or all of the road wheels 6, 7. The transmission 15 may be of any suitable type able to provide two or more drive ratios between the high voltage electric traction motor 26 and the rear wheels 7.

With reference to FIG. 3, the coupling 11 comprises a flywheel 11F of predefined inertia fastened to one end of a crankshaft 10C of the reciprocating piston engine 10, a drive plate 11D of lower inertia than the flywheel 11F driveably connected to an input shaft 22S of the high voltage electrical generator 22 and a resilient rotary drive 11S driveably connecting the flywheel 11F to the drive plate 11D. The resilient rotary drive 11S may for example comprise a number of compression springs interposed between respective abutments on the flywheel 11F and the drive plate 11D. The compression springs may be tangentially arranged with respect to a circle centered on a longitudinal axis of rotation X-X extending between the crankshaft 10C and the input shaft 22S of the high voltage electrical generator 22. Such a resilient rotary drive arrangement may be often be used in friction clutch driven plates and in dual mass flywheels and so will not be described in detail here.

One advantage of such a coupling is that the additional mass of the coupling 11 does not greatly increase the total mass compared to a standard flywheel for such an engine. A further advantage of such a coupling is that it is of relatively simple construction and can be produced at a lower cost compared to the cost of incorporating a standard flywheel.

It will be appreciated that the torque supplied from the engine 10 represents a dynamic force input to the coupling comprised of the flywheel 11F, the resilient rotary drive 11S and the drive plate 11D that in use is transferred to the input shaft 22S of the high voltage electric generator 22.

The high voltage electrical system 20 includes the high voltage electrical generator 22 (also referred herein as electric generator 22) driven via the coupling 11 by the engine 10, a high voltage power distribution module 24, a high voltage electrical storage device in the form of a 48 volt battery pack 25 to store electrical energy input from an external mains supply to which it is selectively connectable via a mains connector 21, a high voltage electric traction motor 26 electrically connectable to the high voltage storage device 25 and arranged to selectively drive the transmission 15 and, in the case of this example, an AC to DC converter 28 to supply electrical energy to the low voltage battery 32 to recharge it. The electric motor 26 may not be mechanically coupled to or driven by a shaft of the electric generator 22, and the only power transfer between the electric motor 26 and the electric generator 22 is through an electrical power system.

The low voltage electrical system 30 includes a low voltage electrical storage device in the form of a 12 volt battery 32, an electronic controller 31 and a driver demand input device in the form of a position sensor 33 connected to an accelerator pedal to provide a signal to the electronic controller 31 indicative of driver demand.

The high voltage power distribution module 24 comprises in the case of this example, a control module 24C to control the flow of high voltage electrical power in the high voltage electrical system 20 between the various components forming the high voltage electrical system 20 and an AC to DC converter 24T to convert mains alternating current into the high voltage direct current that is stored in the high voltage battery 25. It will be appreciated that in some alternative embodiments the function of the AC to DC converter 24T can be performed by an external unit so that the mains connector 21 when connected to a mains supply receives a direct current supply of the correct voltage for storage in the high voltage battery 25. The control module 24C of the high voltage power distribution module 24 is operatively connected to and controlled by the electronic controller 31 of the low voltage electrical system 30.

The electronic controller 31 which it will be appreciated could be formed from a number of connected electronic units but is shown in FIGS. 1 and 2 as a single unit is arranged to control the operation of the engine 10, the high voltage electrical generator 22 and the flow of high voltage electrical power to the various components of the motor vehicle 5.

In the case of this example the high voltage generator 22 is in the form of a brushless alternator composed of two alternators built end-to-end on one shaft. A large or primary alternator of the two alternators produces a high voltage power output from the high voltage electrical generator 22 and a smaller alternator that forms an exciter alternator for the primary alternator. A bridge rectifier often referred to as a rotating rectifier assembly is mounted on the rotor. The exciter alternator has stationary field coils and a rotating armature and the primary alternator uses the opposite configuration with a rotating field and a stationary armature. It will be appreciated that other types of electrical generator may be used and that the disclosure is not limited to the use of such a generator.

The electronic control unit 31 is arranged to vary the amount of direct current passing through the stationary exciter field coils of the exciter alternator thereby varying a 3 phase output from the exciter alternator. This 3 phase output is rectified by the rotating rectifier assembly mounted on the rotor and the resultant DC supplies the rotating field of the main alternator and hence alternator output. The effect of this is that the small DC exciter current indirectly controls the high voltage output from the main alternator part of the high voltage electrical generator 22.

The control module 24C of the high voltage power distribution module 24 is arranged to control the flow of high voltage electrical power in a number of differing operational modes non-limiting examples of which are set out briefly below.

a/ When there is a requirement to drive the motor vehicle 5 and there is sufficient power stored in the high voltage battery 25, the control module 24C provides a supply of high voltage electrical energy from the high voltage battery 25 to the high voltage electric traction motor 26;

b/ When there is a requirement to drive the motor vehicle 5 and there is insufficient power stored in the high voltage battery 25, the control module 24C provides a supply of high voltage electrical energy from the high voltage electrical generator 22 to the high voltage electric traction motor 26. There is insufficient power stored in the high voltage battery 25 when the state of charge of the high voltage battery 25 falls below a predefined level such as, for example but without limitation, 20%. Providing a supply of high voltage electrical energy from the high voltage electrical generator 22 to the high voltage electric traction motor 26 will include providing a signal to the electronic controller 31 that the engine 10 needs to be run to provide electrical power;

c/ When there is a requirement to charge the high voltage battery 25, the control module 24C provides a supply of high voltage electrical energy from the mains connector 21 to the high voltage battery 25 when a connection is made to an external mains supply; and d/ When there is a requirement to charge the low voltage battery 32, the control module 24C provides a supply of high voltage alternating current electrical energy from the high voltage electrical generator 22 to the AC to DC converter 28 to charge the low voltage battery 32.

In some embodiments, when the motor vehicle 5 is stationary and there remains a requirement to charge the high voltage battery 25, the engine 10 is allowed to continue running and the electrical energy produced by the high voltage electrical generator 22 is transferred via an AC-DC converter (not shown) to recharge the high voltage battery 25.

Whenever the reciprocating piston combustion engine 10 is running, the electronic controller 31 uses a combustion model 35 to produce an output of expected(predicted) torque variations from the reciprocating piston engine 10 based upon one or more inputs indicative of the operation of the reciprocating piston engine 10 and uses the outputted torque variations to control the operation of the high voltage electrical generator 22 by, in the case of this example, varying the magnitude of the field current through the stationary exciter field coils of the exciter alternator of the high voltage electrical generator 22 as previously referred to. The fundamental operating principle being that the high voltage electrical generator 22 is controlled to vary the torque required to drive it so as to compensate for expected variations in engine output torque from the engine 10 thereby removing the need for a very heavy flywheel to be fastened to the engine 10. It will be appreciated that as the torque output (T) from the engine 10 varies it will result in variations of the instantaneous rotational speed of the crankshaft 10C however if the torque required to drive the high voltage electric generator 22 referred to herein as generator driving torque (G) is varied in a similar manner then any resulting fluctuations in rotational speed of the input shaft 22S of the high voltage electrical generator 22 may be significantly reduced.

Referring now to FIG. 2 the electronic controller 31 in the case of this example comprises a torque set point module 34, the function of which is to set the torque output required from the engine 10 in order to provide a desired level of electrical energy from the high voltage electric generator 22 to the high voltage electric traction motor 26 to meet a demand from a user of the motor vehicle 5. The demand for torque from the high voltage electric traction motor 26 from the user is input to the electronic controller 31 as a driver demand input which in this case is in the form of an output from the position sensor 33 attached to the accelerator pedal.

The torque set point module 34 supplies an output indicative of the set torque level to the combustion model 35 of expected torque variations from the engine 10. It will be appreciated that the magnitude of the mean torque output from the engine 10 will be varied to meet the demand from the high voltage electric traction motor 26.

The combustion model 35 receives a number of additional inputs that include an input indicative of the rotational speed of the crankshaft 10C of the reciprocating piston engine 10 and an input indicative of the rotational position of the crankshaft 10C of the reciprocating piston engine 10.

The combustion model 35 uses all these inputs along with details regarding the configuration of the engine such as the number of cylinders of the engine 10 and the combustion timing of the engine 10 to produce then output indicative of the expected torque variations from the engine 10. The output of expected torque variations from the model 35 is supplied to a dynamic system model 36 of the drive path from the engine 10 to the high voltage electrical generator 22.

The dynamic system model 36 uses the input from the combustion model 35 and parameters such as inertia and torsional stiffness of the drive path from the engine 10 to the high voltage electric generator 22 to produce an electrical output from the dynamic system model 36 that is used to control the operation of the high voltage electrical generator 22 by varying the field current as previously described.

Due to the presence of the resilient rotary drive 11S in the drive path from the engine 10 to the high voltage electrical generator 22, as shown in plot 400 in FIG. 4, the driving torque in the form of an electrical input (G, line 402) required for driving the high voltage electrical generator 22 is positive phase shifted by an amount delta (δ) with respect to the torque (T, line 404) expected from the engine 10 so as to lead the expected torque (T) from the engine 10. The phase shift is also required to compensate for variations between the monitoring signal used to control the system and the resultant torque output (T) from the engine 10.

The effect of this positive phase shift is that the driving torque/electrical input (G) for the high voltage generator 22 increases before the expected increase in output torque (T) from the engine 10 when the torque output (T) from the engine 10 is increasing and reduces before the expected reduction in output torque (T) from the engine 10 when the torque output (T) from the engine 10 is reducing thereby reducing peak acceleration of the input shaft of the high voltage electric generator 22.

The electronic controller 31 may also include a mode selection module 37 that is used to determine the mode of operation of the motor vehicle 5. That is to say, the mode selection module 37 decides when to power the high voltage electric traction motor 26 of the vehicle 5 using electric power from the high voltage battery 25 and when the electric power required to power the high voltage electric traction motor 26 of the vehicle 5 must be supplied by running the engine 10 to drive the high voltage electric generator 22.

Although in the case of this example the term 'low voltage' has been used in respect of a voltage of 12 volts and 'high voltage' has been used with respect to a voltage of 48 volts it will be appreciated that the disclosure is not limited to the use of such voltages.

Figure 5:
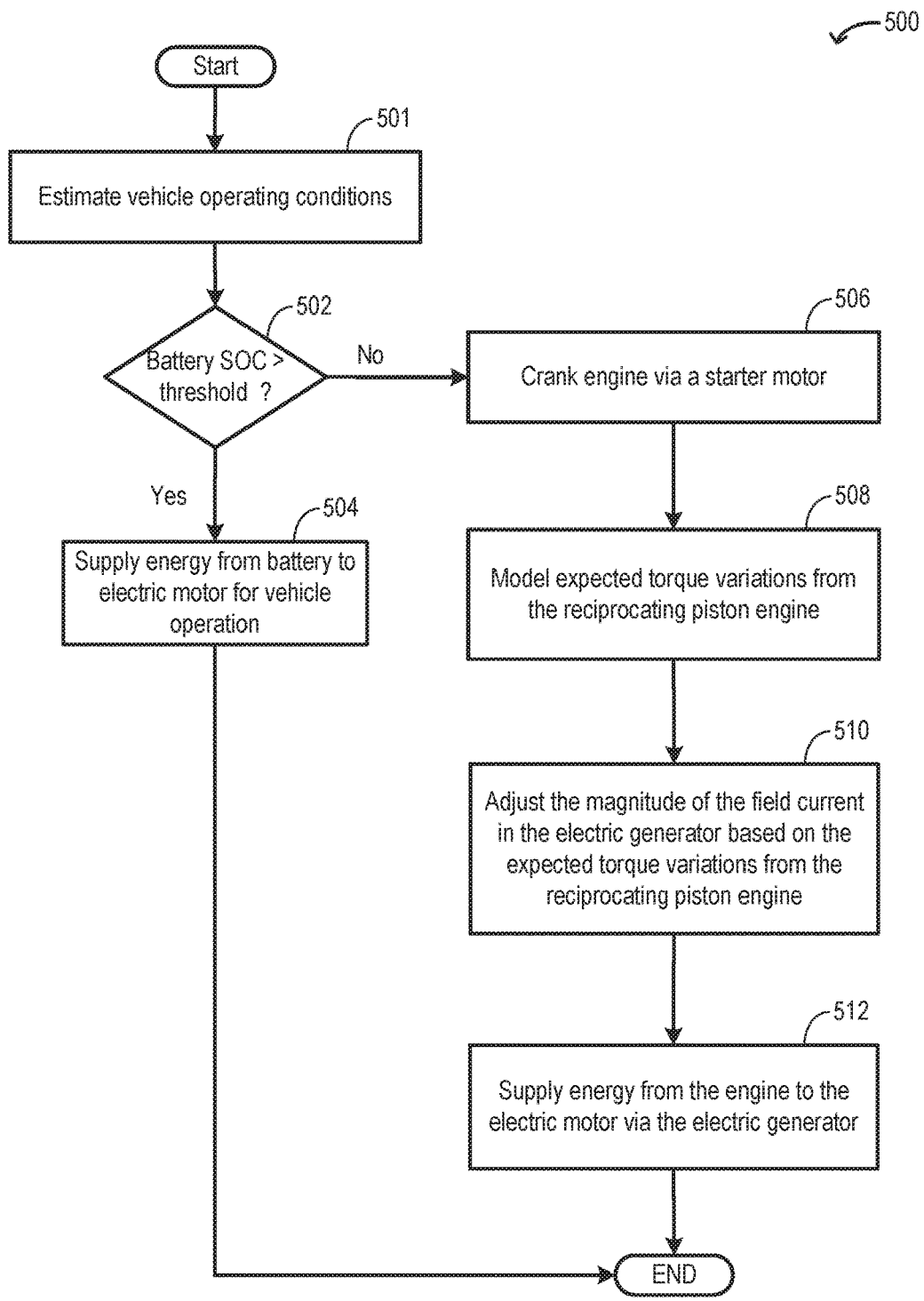
FIG. 5 is a flow-chart showing adjusting of the electrical generator based on expected torque variations from the reciprocating piston engine.
Figure 6:
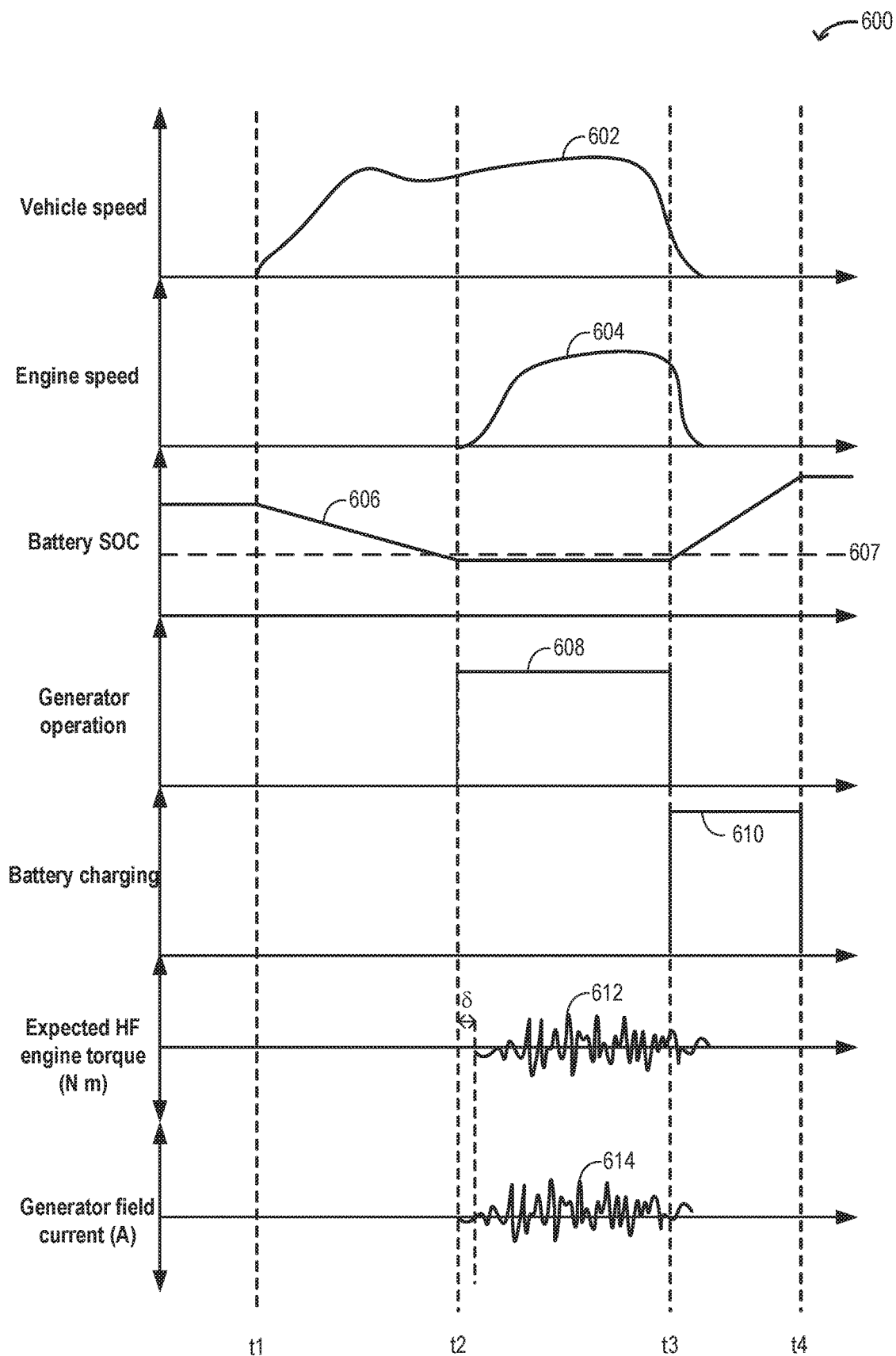
FIG. 6 shows an example timeline of operation of the PHEV.

FIG. 5 shows an example method 500 that can be implemented to adjust operation of an electrical generator (such as generator 22 in FIG. 1) based on expected torque variations from a reciprocating piston engine (such as engine 10 in FIG. 1) coupled to a plug-in hybrid electric vehicle (such as PHEV 5 in FIG. 1). Instructions for carrying out method 500 and the rest of the methods included herein may be executed by a controller based on instructions stored on a memory of the controller and in conjunction with signals received from sensors of the engine system (reciprocating piston engine), such as the sensors described above with reference to FIG. 1. The controller may employ engine actuators of the engine system to adjust engine operation, according to the methods described below.

At 501, vehicle operating conditions may be estimated and/or measured. The PHEV may be operated via motor torque and/or engine torque. Vehicle operating conditions may be measured, estimated or inferred, and may include vehicle speed, operator torque demand, motor torque supplied to propel the vehicle, as well as various engine conditions, such as engine speed, engine load, and engine temperature. A state of charge (SOC) of a battery (such as high voltage battery 25 in FIG. 1) may be estimated. Also, ambient conditions such as ambient temperature, pressure, and humidity may be estimated.

At 502, the routine includes determining if the SOC of the battery is higher than a threshold SOC. The threshold SOC may correspond to the amount of energy desired to propel the vehicle and provide the demanded torque. In one example, the threshold SOC may be 20% of the total battery capacity.

If it is determined that the SOC of the high voltage battery is higher than the threshold SOC, at 504, the vehicle may be propelled via motor torque with the energy supplied to the motor from the battery. If it is determined that the SOC of the battery is lower than the threshold SOC, it may be inferred that energy from combustion at the vehicle engine may be used to operate the vehicle. The energy from the engine may be transferred to the vehicle drive line via an electric generator, a high voltage power distribution module, and the traction motor.

At 506, the controller may send a signal to a starter motor coupled to the engine to crank the engine until the engine reaches an idling speed. Also, combustion in the engine cylinders may be initiated by supplying fuel and initiating spark in the engine cylinders. After cranking is complete, energy from combustion may cause the crankshaft to rotate. Due to variations in torque produced by the engine, torsional vibrations may be transmitted to the electric generator via a coupling (connecting the engine to the generator) including a flywheel, a resilient rotary drive, and a drive plate. Such vibrations may be detrimental to the operation of the electric generator and may cause degradation of the generator.

At 508, the controller may model (predict) expected torque variations from the reciprocating piston engine. A combustion model may be used to estimate the expected torque variations based on engine operating parameters including a rotational speed of the engine crankshaft and a rotational position of the crankshaft. In addition, the combustion model may take into account a number of cylinders of the engine, combustion timing of the engine, torque demand to be met by the reciprocating piston engine, engine temperature, etc. while estimating the expected torque variations. The combustion model may use the above mentioned parameters to also estimate (predict) an expected torque output of the engine during engine operation.

At 510, a magnitude of a field current through stationary exciter field coils of an exciter alternator of the electric generator is adjusted based on the modelled, expected torque variations from the engine. In one example, the magnitude of the field current may be increased proportional to an increase in the modelled expected torque variation. In another example, the magnitude of the field current may be decreased proportional to a decrease in the modelled expected torque variation.

The output of expected torque variations from the model may be provided to a dynamic system model of the drive path from the engine to the electrical generator. Using the input from the combustion model and further using parameters such as inertia and torsional stiffness of the drive path from the engine to the electric generator, the dynamic system model may estimate an electrical output to be applied to the generator. The electrical output from the dynamic system model may be applied to the generator by varying the field current. By varying the field current based on an expected variation in engine torque output, the expected variations in engine output torque from the engine may be preemptively compensated, thereby protecting the generator from undesired vibrations. The torque delivered (in the form if an electrical input) to drive the high voltage electrical generator may be positive phase shifted with respect to the estimated torque of the reciprocating piston engine so as to lead the expected torque variations of the reciprocating piston engine.

At 512, in order to propel the vehicle, energy may be supplied from the engine to the electric motor via the electric generator. In this way, the engine torque may be transferred to the vehicle driveline and the wheels.

In this way, in a plug-in hybrid electric vehicle, during a first condition, the vehicle may be operated via an electric motor powered by engine torque delivered to the motor from an engine via a generator, an electrical input to the generator adjusted based on an estimated variation in engine torque; and during a second condition, the vehicle may be operated via the electric motor powered by a battery while maintaining the engine and the generator inactive. The first condition may include a lower than threshold state of charge of the battery and the second condition may include a higher than threshold state of charge of the battery, the threshold state of charge based on operator torque demand.

FIG. 6 shows an example timeline 600 illustrating operation of a plug-in hybrid electric vehicle (PHEV). The horizontal (x-axis) denotes time and the vertical markers t1-t4 identify significant times in the routine for engine operation.

The first plot, line 602, shows a variation in vehicle speed over time. The second plot, line 604, shows engine speed as estimated via a crankshaft sensor. The third plot, line 606, shows a state of charge (SOC) in a high voltage battery coupled to an electric motor driving the vehicle. Dashed line 607 denotes a threshold battery SOC below which energy from the battery will not be sufficient for vehicle propulsion. In one example, the threshold is calibrated as a function of the torque demand. The fourth plot, line 608, shows operation of an electric generator capable of generating electric energy from mechanical power received form the vehicle engine. The fifth plot, line 610, shows charging of the on-board battery from an external power source. The sixth plot, line 612, shows the high frequency component of an expected engine torque (in N. m) as modelled (predicted) by the controller based on one or more of a rotational speed of a crankshaft coupled to the engine, a rotational position of the crankshaft, engine load, a number of cylinders coupled to the engine, and a combustion timing of the engine cylinders. The seventh plot, line 614, shows a magnitude of a field current (in ampere) through stationary exciter field coils of an exciter alternator of the electric generator.

Prior to time t1, the vehicle is not being propelled and both the engine and the generator are maintained in shut down conditions. As energy from the battery is not used for vehicle operation and the battery is not being externally charged, the battery SOC remains constant.

At time t1, vehicle operation is initiated and between time t1 and t2, the vehicle is propelled via energy supplied from the battery. As the energy from the battery is used via a traction motor to drive the vehicle wheels, the battery SOC decreases gradually and at time t2, the battery SOC reduces to below the threshold 607. In order to continue providing the demanded torque, combustion in engine cylinders is initiated. Between time t2 and t3, the engine is operated to provide the desired power for operating the vehicle. The electric generator is operated to convert the mechanical power output from the engine to electrical energy used by the traction motor to propel the vehicle. A model is used to predict expected torque variations during engine operation and operation of the generator is adjusted such as by varying a magnitude of current through stationary exciter field coils of the electrical generator to compensate for the expected variations in engine output torque. The estimated variations in torque is modelled based on one or more of a rotational speed of a crankshaft coupled to the engine, a rotational position of the crankshaft, engine load, a number of cylinders coupled to the engine, and a combustion timing of the engine cylinders. The magnitude of the field current is estimated via a dynamic system model based the estimated variations in torque, on each of an inertia and a torsional stiffness of a drive plate coupling the engine to the electric generator.

As shown in this example, the electrical current delivered to drive the generator is positive phase shifted by "δ" relative to an estimated torque output of the engine. By compensating for the expected torque variations during engine operation, exposure of the generator to undesired vibrations from engine operations may be reduced, thereby increasing generator efficiency.

At time t3, the vehicle comes to rest and is no longer propelled via engine torque or battery power. The battery is charged via an external power source between time t3 and t4 and the battery SOC steadily increases. After time t4, the battery is disconnected from the external power source and the energy is stored in the battery for future vehicle operations.

In this way, during operation of an engine coupled to a hybrid vehicle, an input to a generator generating electric power to drive a traction motor is adjusted based on an expected torque variations from the engine.

An example system for a range extended plug-in hybrid electric vehicle comprises: a reciprocating piston engine, a drivetrain including a transmission driving at least one road wheel, a low voltage electrical system including a low voltage electrical storage device and an electronic controller, a high voltage electrical system including a high voltage electrical generator driven via a coupling by the reciprocating piston engine, a high voltage electrical storage device to store electrical energy input from an external mains supply, a high voltage electric traction motor electrically connected to the high voltage storage device and arranged to selectively drive the transmission, and a controller with computer readable instructions stored on non-transitory memory to: during operation of the reciprocating piston combustion engine use a model to produce an output of expected torque variations from the reciprocating piston engine based upon one or more inputs indicative of the operation of the reciprocating piston engine and use the output of torque variations from the model to control the operation of the high voltage electrical generator. In any or all of the preceding examples, additionally or optionally, controlling operation of the high voltage electrical generator includes varying a torque driving the generator to compensate for the expected variations. In any or all of the preceding examples, additionally or optionally, varying the torque driving the generator includes varying a magnitude of current flowing through stationary exciter field coils of the high voltage electrical generator. In any or all of the preceding examples, additionally or optionally, the controller includes further instructions to: provide the output of the expected torque variations from the model to a dynamic system model of a drive path from the engine to the high voltage electrical generator, and use an output from the dynamic system model to vary the magnitude of current flowing through the stationary exciter field coils. In any or all of the preceding examples, additionally or optionally, the torque driving the high voltage electrical generator is phase shifted with respect to the expected torque variations of the reciprocating piston engine to lead the expected torque variations of the reciprocating piston engine. In any or all of the preceding examples, additionally or optionally, the one or more inputs indicative of the operation of the reciprocating piston engine include each of a rotational speed of a crankshaft of the reciprocating piston engine, a rotational position of the crankshaft, a torque demand to be met by the reciprocating piston engine, a number of cylinders of the reciprocating piston engine, and a combustion timing of the reciprocating piston engine. In any or all of the preceding examples, additionally or optionally, the coupling comprises a flywheel of a predefined inertia fastened to one end of the crankshaft of the reciprocating piston engine, a drive plate of lower inertia relative to the predefined inertia of the flywheel driveably connected to an input shaft of the high voltage electrical generator, and a resilient rotary drive driveably connecting the flywheel to the drive plate.

Another engine example method comprises: during operation of an engine coupled to a hybrid vehicle, adjusting an input to a generator generating electric power to drive a traction motor based on an expected torque variations from the engine. In any preceding example, additionally or optionally, adjusting the input to the generator includes increasing or decreasing a magnitude of a field current through stationary exciter field coils of an exciter alternator of the electric generator based on the expected torque variations. In any or all of the preceding examples, additionally or optionally, the magnitude of the field current is estimated via a dynamic system model, the magnitude further based on each of an inertia and a torsional stiffness of a drive plate coupling the engine to the electric generator. In any or all of the preceding examples, additionally or optionally, the expected torque variations is modelled based on one or more of a rotational speed of a crankshaft coupled to the engine, a rotational position of the crankshaft, engine load, a number of cylinders coupled to the engine, and a combustion timing of the engine cylinders. In any or all of the preceding examples, the method further comprising, additionally or optionally, positive phase shifting an electrical signal delivered to drive the generator relative to an estimated torque output of the engine. In any or all of the preceding examples, additionally or optionally, the generator converts engine torque to electrical energy transmitted to the traction motor driving the vehicle. In any or all of the preceding examples, additionally or optionally, the generator is coupled to the crankshaft via each of a flywheel, a rotary drive, a drive plate, and an input shaft, the drive plate having a lower inertia relative to the flywheel.

In yet another example, a method for a plug-in hybrid electric vehicle, comprises: during a first condition, operating the vehicle via an electric motor powered by electrical energy generated from engine torque via a generator, an electrical input to the generator adjusted based on an estimated variation in engine torque, and during a second condition, operating the vehicle via the electric motor powered by a battery while maintaining the engine and the generator inactive. In any preceding example, additionally or optionally, the first condition includes a lower than threshold state of charge of the battery and the second condition includes a higher than threshold state of charge of the battery, the threshold state of charge based on operator torque demand wherein a shaft of the electric motor is not mechanically coupled to or driven by a shaft of the generator, and where the only power transfer between the electric motor and the generator is through an electrical power system. In any or all of the preceding examples, additionally or optionally, the electrical input to the generator is adjusting by adjusting a magnitude of a field current through stationary exciter field coils of an exciter alternator of the electric generator. In any or all of the preceding examples, additionally or optionally, the magnitude of the field current based on each of estimated variations in torque generated by the engine, inertia of a drive plate coupling the engine to the generator, and a torsional stiffness of the drive plate. In any or all of the preceding examples, additionally or optionally, the estimated variations in torque is modelled based on one or more of a rotational speed of a crankshaft coupled to the engine, a rotational position of the crankshaft, engine load, a number of cylinders coupled to the engine, and a combustion timing of the engine cylinders. In any or all of the preceding examples, additionally or optionally, the electrical input to the generator is positive phase shifted relative to an estimated engine torque.

It will be appreciated by those skilled in the art that although the disclosure has been described by way of example with reference to one or more embodiments it is not limited to the disclosed embodiments and that alternative embodiments could be constructed without departing from the scope of the disclosure as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a range extended plug-in hybrid electric vehicle, comprising:
   a reciprocating piston engine, a drivetrain including a transmission driving at least one road wheel, a low voltage electrical system including a low voltage battery and an electronic controller, a high voltage electrical system including a high voltage electrical generator driven via a coupling with the reciprocating piston engine, a high voltage battery to store electrical energy input from an external main supply, a high voltage electric traction motor electrically connected to the high voltage battery and arranged to selectively drive the transmission, and a controller with computer readable instructions stored on non-transitory memory to:
  during operation of the reciprocating piston engine, use a model to produce an output of expected torque variations from the reciprocating piston engine based upon one or more inputs indicative of the operation of the reciprocating piston engine and use the output of expected torque variations from the model to control the operation of the high voltage electrical generator;
  wherein controlling operation of the high voltage electrical generator includes phase shifting a torque driving the high voltage electrical generator with respect to the expected torque variations of the reciprocating piston engine to lead the expected torque variations of the reciprocating piston engine.

2. The system of claim 1, wherein controlling operation of the high voltage electrical generator includes varying the torque driving the high voltage electrical generator to compensate for the expected torque variations.

3. The system of claim 2, wherein varying the torque driving the high voltage electrical generator includes varying a magnitude of current flowing through stationary exciter field coils of the high voltage electrical generator.

4. The system of claim 3, wherein the controller includes further instructions to: provide the output of the expected torque variations from the model to a dynamic system model of a drive path from the reciprocating piston engine to the high voltage electrical generator, and use an output from the dynamic system model to vary a magnitude of current flowing through the stationary exciter field coils.

5. The system of claim 1, wherein the one or more inputs indicative of the operation of the reciprocating piston engine include each of a rotational speed of a crankshaft of the reciprocating piston engine, a rotational position of the crankshaft, a torque demand to be met by the reciprocating piston engine, a number of cylinders of the reciprocating piston engine, and a combustion timing of the reciprocating piston engine.

6. The system of claim 5, wherein the coupling comprises a flywheel of a predefined inertia fastened to one end of the crankshaft of the reciprocating piston engine, a drive plate of lower inertia relative to the predefined inertia of the flywheel driveably connected to an input shaft of the high voltage electrical generator, and a rotary drive driveably connecting the flywheel to the drive plate.

7. A method, comprising:
  during operation of an engine coupled to a hybrid vehicle, adjusting an input to a generator generating electric power to drive a traction motor based on expected torque variations from the engine; and
  phase shifting an electrical signal delivered to drive the generator relative to an estimated torque output of the engine.

8. The method of claim 7, wherein adjusting the input to the generator includes increasing or decreasing a magnitude of a field current through stationary exciter field coils of an exciter alternator of the generator based on the expected torque variations.

9. The method of claim 8, wherein the magnitude of the field current is estimated via a dynamic system model, the magnitude further based on each of an inertia and a torsional stiffness of a drive plate coupling the engine to the generator.

10. The method of claim 9, wherein the expected torque variations are modelled based on one or more of a rotational speed of a crankshaft coupled to the engine, a rotational position of the crankshaft, engine load, a number of cylinders coupled to the engine, and a combustion timing of the cylinders.

11. The method of claim 7, wherein the phase shifting includes positive phase shifting the electrical signal delivered to drive the generator relative to the estimated torque output of the engine.

12. The method of claim 7, wherein the generator converts engine torque to electrical energy transmitted to the traction motor driving the vehicle.

13. The method of claim 10, wherein the generator is coupled to the crankshaft via each of a flywheel, a rotary drive, a drive plate, and an input shaft, the drive plate having a lower inertia relative to the flywheel.

14. A method for a plug-in hybrid electric vehicle, comprising:
  during a first condition, operating the vehicle via an electric motor powered by electrical energy generated from engine torque via a generator, an electrical input to the generator adjusted based on an estimated variation in engine torque, wherein the electrical input to the generator is positive phase shifted relative to an estimated engine torque; and
  during a second condition, operating the vehicle via the electric motor powered by a battery while maintaining an engine and the generator inactive.

15. The method of claim 14, wherein the first condition includes a lower than threshold state of charge of the battery and the second condition includes a higher than threshold state of charge of the battery, the threshold state of charge based on operator torque demand, wherein a shaft of the electric motor is not mechanically coupled to or driven by a shaft of the generator, and wherein the only power transfer between the electric motor and the generator is through an electrical power system.

16. The method of claim 14, wherein the electrical input to the generator is adjusted by adjusting a magnitude of a field current through stationary exciter field coils of an exciter alternator of the generator.

17. The method of claim 16, wherein the magnitude of the field current is based on each of estimated variations in torque generated by the engine, inertia of a drive plate coupling the engine to the generator, and a torsional stiffness of the drive plate.

18. The method of claim 16, wherein the estimated variations in torque are modelled based on one or more of a rotational speed of a crankshaft coupled to the engine, a rotational position of the crankshaft, engine load, a number of cylinders coupled to the engine, and a combustion timing of the cylinders.

* * * * *